April 14, 1970      J. E. POOLEY      3,506,166

DETACHABLE, ELECTRICALLY ACTUATED DISPENSING VALVE

Filed March 11, 1968

INVENTOR
J. E. POOLEY
BY
Holcombe, Wezkeiell & Dubois
ATTORNEYS

United States Patent Office 3,506,166
Patented Apr. 14, 1970

3,506,166
DETACHABLE, ELECTRICALLY-ACTUATED DISPENSING VALVE
Jack Edward Pooley, Kingswood, England, assignor to British Bevolux Limited
Filed Mar. 11, 1968, Ser. No. 712,044
Claims priority, application Great Britain, Mar. 21, 1967, 13,137/67
Int. Cl. G01f 11/28
U.S. Cl. 222—439                        3 Claims

ABSTRACT OF THE DISCLOSURE

The invention relates to a dispenser, more especially for dispensing measured quantities of liquid, and consists of a device for attachment to a container for the liquid and comprising a chamber formed by two axially spaced members which also form the inlet and outlet of the chamber, a valve body arranged in said chamber so as to be movable, preferably by a solenoid, between said inlet and outlet for selectively opening one whilst closing the other, and means for effecting relative axial adjustment of the two axially spaced members to vary the capacity of the chamber.

---

This invention relates to and has for its object to provide improved means for dispensing liquid, powder, granular or other fluid substance from a container and is concerned more especially with means for dispensing such fluid substance in predetermined or measured quantities.

According to the invention the dispensing means comprises a chamber, an inlet opening into said chamber and connected with a source of fluid substance to be dispensed, an outlet opening from said chamber for the discharge of the fluid substance, a valve member arranged within said chamber so as to be movable between a first position in which it closes said outlet and opens said inlet, to a second position in which it opens said outlet and closes said inlet, and means being provided for moving said valve member between said first and second positions.

According to another aspect of the invention the dispensing means according to the invention comprises a chamber, an inlet leading into said chamber from said container, an outlet leading from said chamber, a valve member movable within said chamber between said outlet and said inlet and means for moving said valve member between said outlet and said inlet, the arrangement being such that said valve member is movable from a first position, in which it closes said outlet and opens said inlet to permit fluid substance to flow from said container into said chamber whilst preventing said substance from flowing out of said chamber, to a second position in which it closes said inlet to prevent the fluid substance from flowing from said container into said chamber whilst permitting fluid substance to flow out of said chamber.

Figure 1:
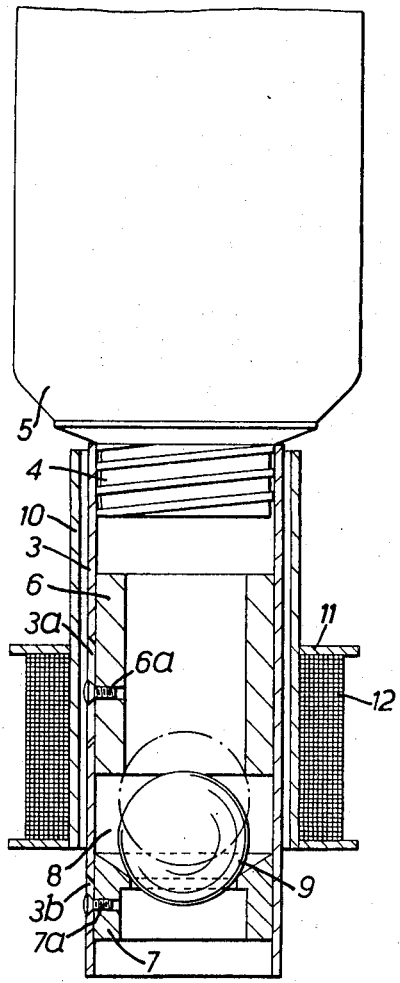
Figure 2:
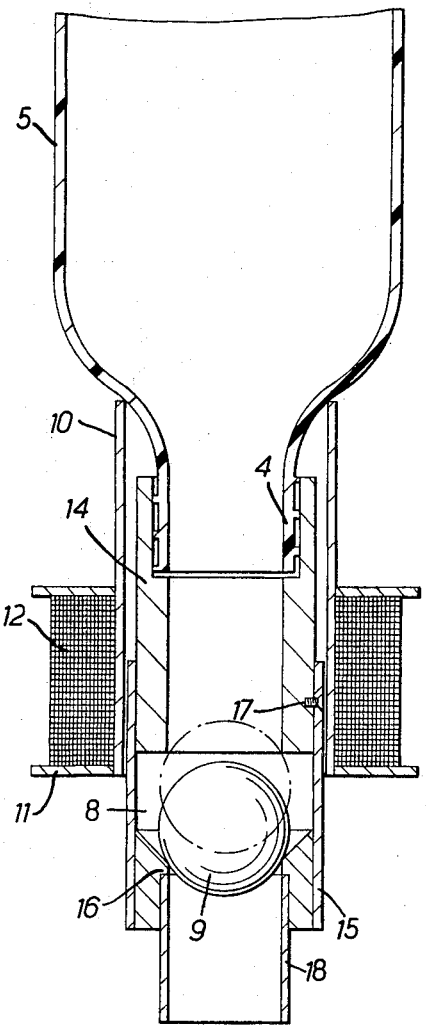

In order that the invention may be more clearly understood two particular embodiments thereof will now be described, by way of example, with reference to the accompanying drawings in which:

FIGURE 1 is an axial sectional view of an at present preferred embodiment of the dispenser; and FIGURE 2 is a similar view of a further embodiment of the dispenser.

Referring first to FIGURE 1 of these drawings the dispenser comprises an outer cylindrical casing 3 screwed onto the neck 4 of a container 5 containing the liquid or other fluid substance to be dispensed. Mounted within the outer cylindrical casing 3 is a tubular member 6 and a ring member 7 arranged in axially spaced relationship in the outer casing 3 to form a chamber 8 therebetween. Both the tubular member 6 and the ring member 7 are axially slidable in the casing 3, with a close friction fit, whereby the volumetric capacity of the chamber 8 can be varied by appropriate axial adjustment of the members 6 and 7 towards and away from each other. For the purpose of fixing said members 6 and 7 in their relative adjusted positions each has screwed into it a locking screw 6a and 7a respectively which passes respectively through slots 3a and 3b in the wall of the outer casing 3. The width of each of the slots 3a and 3b is such that the shanks of the screws 6a and 6b can just pass through said slots so that when screwed tight into the members 6 and 7 respectively the heads of the screws engage the casing 3 at the edges of the slots to lock the members 6 and 7 in position in said casing.

The tubular member 6 forms an inlet through which the contents of the container 5 can flow into the chamber 8 and the ring member 7 forms an outlet through which the liquid or other fluid substance can flow from the chamber 8.

Within said chamber 8 is a valve member in the form of a sphere 9 of electromagnetic material which is movable between an annular valve seating in the tubular member 6 and an annular valve seating in the ring member 7 as hereinafter described. In order to enable the liquid or other fluid substance to be dispensed to flow freely through the chamber 8 the cross-sectional area of external diameter of the valve member 8 is substantially less than the cross-sectional area or internal diameter of the chamber 8.

Surrounding the cylindrical chamber 3 is a cylindrical shield 10 carrying a former 11 around which a wire coil 12 is wound to form a solenoid connected by suitable conductors 13 to a source of electric current.

The embodiment according to FIGURE 2 comprises two intertelescopic tubes 14 and 15. The inner tube 14 is provided at one end with internal screw threads for securing it to the externally screw-threaded neck 4 of the container 5 from which liquid or other fluid substance is to be dispensed. The tube 14 has a wall thickness which is substantially greater than the wall thickness of the outer tube 15 and telescopes into said tube 15 with a close friction fit. In the end of the tube 15 remote from the end into which the tube 14 telescopes is a fixed ring 16 having a wall thickness which corresponds substantially to the wall thickness of the tube 14. The tube 14 and ring 16 form the inlet and the outlet respectively of a chamber 8 formed between said tube 14 and ring 16. The capacity of the chamber 8 can be varied as desired by the relative axial adjustment of the telescopic tubes 14 and 15. In order to fix said telescopic tubes in adjusted position a screw 17 is screwed into the wall of the outer tube 14. As in the previously described embodiment a spherical valve member of electromagnetic material is arranged within the chamber 8 so as to be movable between valve seatings on the parts 14 and 16 and surrounding the intertelescopic tubes 14 and 15 is a solenoid formed by a wire coil 12, wound on a former 11 carried by a shield 10, for effecting movement of the valve member 9 between its two seatings. Within the ring 16 is removably fitted a tube 18 forming a discharge nozzle. This nozzle is fitted in the ring 16 with a close friction fit but may be attached to the ring 16 in any other suitable manner, for example by screw thread or by means of a bayonet fitting. A similar discharge nozzle may of course be fitted to the embodiment according to FIGURE 1.

In both embodiments above described the valve member 9 preferably consists of a steel ball but may be made of any other suitable electromagnetic material. The solenoid 12 may also be of any suitable form but one practical construction comprises a coil 30 S.W.G. wire wound around the former 11 and having a total of 3,000 turns.

In operation of the dispenser the solenoid 12 is connected with a suitable source of electric current in a circuit having suitable switch means. When the coil is de-energised the spherical valve member 9 lies on the valve seating in the ring member 7 (FIGURE 1) or 16 (FIGURE 2) under its own weight. In this first position of the valve member shown in full lines, the valve member closes the outlet from the chamber 8, formed by the ring member 7, 16 and opens the inlet formed by the tube 6, 14 thus permitting the liquid or other fluid substance in the container 5 to flow into the chamber 8 whilst preventing the liquid or other fluid substance from flowing through the outlet formed by the ring 7, 16. The valve seating in the ring 7, 16 is preferably conical or tapered as shown to ensure a liquid tight seal. When the chamber 8 has thus been filled with liquid or other fluid substance the solenoid is energised thereby setting up an electromagnetic field within the chamber 8 which causes the valve member to be moved off its seat in the ring 7, 16 (as shown in full lines) onto the valve seating in the tube 6, 14 (as shown in dotted lines), thereby opening the outlet from chamber 8 to permit liquid or other fluid substance to flow out of the chamber whilst closing the inlet to said chamber and preventing liquid or other fluid substance from flowing into said chamber from container 5. When the chamber has thus been emptied the solenoid is again de-energised whereby the valve member 9 will drop back onto its seating in the ring 7, 16 when the chamber 8 will be re-filled so that the cycle above described can be repeated.

In certain circumstances it is preferable to use an A.C. current to energise the solenoid 12 since by this means the valve member 9 is caused to vibrate when the solenoid is energised. This has particular advantages when the dispensing device is used for dispensing powder or granular substances since it reduces the tendency for such substances to clog or "funnel" in the chamber 8. In order to still further enhance the discharge of the contents of the container 5 into the chamber 8 said container is preferably not held rigidly but is supported so as to permit it also to vibrate, when A.C. current is used.

What is claimed is:

1. Means adapted to be detachably connected to a container for dispensing a predetermined quantity of a fluid therefrom, said means comprising an inner tubular member, an outer tubular member surrounding and coaxial with said inner tubular member, solenoid means carried by said outer tubular member, a pair of axially spaced annular members mounted within said inner tubular member so that at least one of them is slidable therein relative to the other, each of said annular members defining a valve seat and said pair of annular members defining with said inner tubular member a chamber the volumetric capacity of which may be varied by sliding at least one of said annular members relative to the other, means for securing at least one of said annular members in different axially adjusted positions, and a ball valve member of magnetic material mounted between said axially spaced annular members, said outer tubular member and solenoid means being slidable with respect to said inner tubular member to move said ball valve between a position engaging the valve seat on one of said annular members and a position engaging the valve seat in the other of said annular members.

2. Means as claimed in claim 1 in which said inner tubular member is adapted to be detachably connected to said container.

3. Means as claimed in claim 1 in which one of said annular members is adapted to be detachably connected to said container.

References Cited

UNITED STATES PATENTS

| 1,342,641 | 6/1920 | Moreton | 251—139 |
| 1,911,692 | 5/1933 | Jalandoni | 222—439 X |
| 2,609,974 | 9/1952 | Brous | 222—453 X |
| 2,784,885 | 3/1957 | Kneisley et al. | 222—439 |
| 3,190,503 | 6/1965 | Fjermestad | 222—439 X |

STANLEY TOLLBERG, Primary Examiner

U.S. Cl. X.R.

251—139